July 3, 1962
O. LOPEZ
3,042,827
MOTOR VEHICLE HEADLIGHT CONSTRUCTION AND
POLARIZED GLASSES USED THEREWITH
Filed Sept. 30, 1958
2 Sheets-Sheet 1
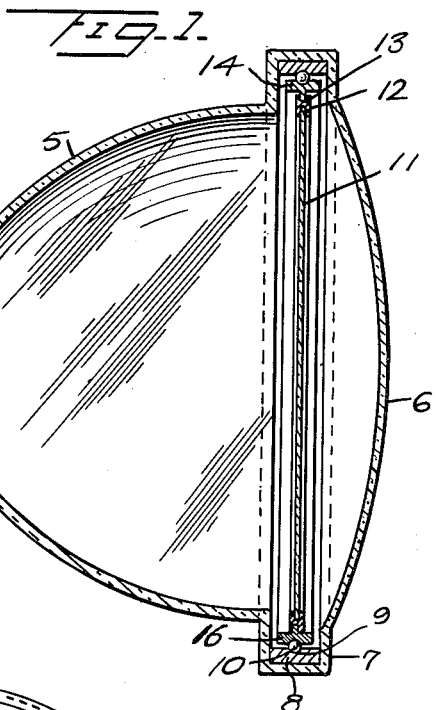
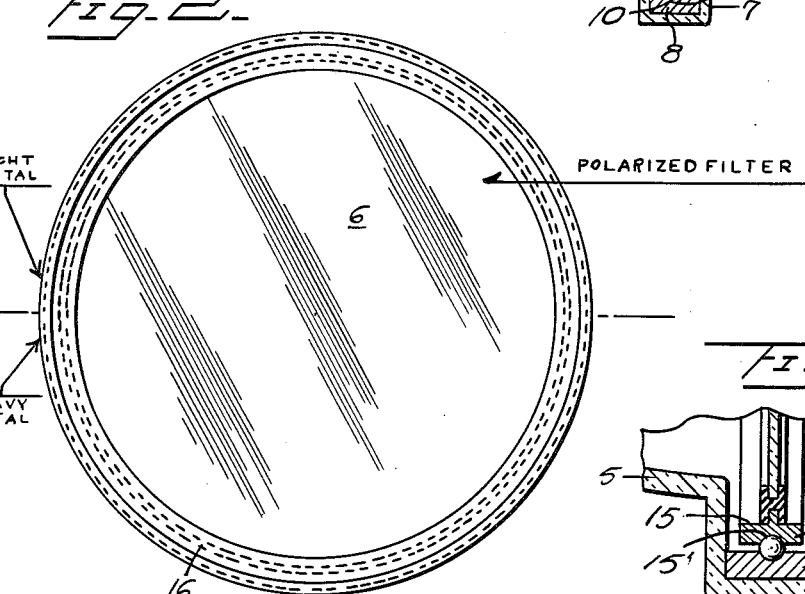
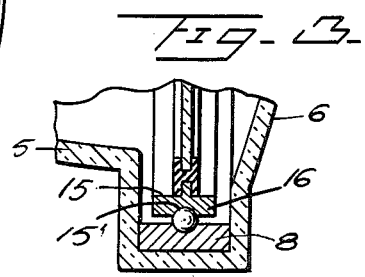
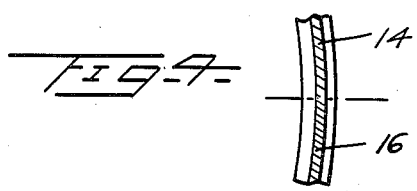
Orlando Lopez
INVENTOR
BY *CA Snow & Co.*
ATTORNEYS.

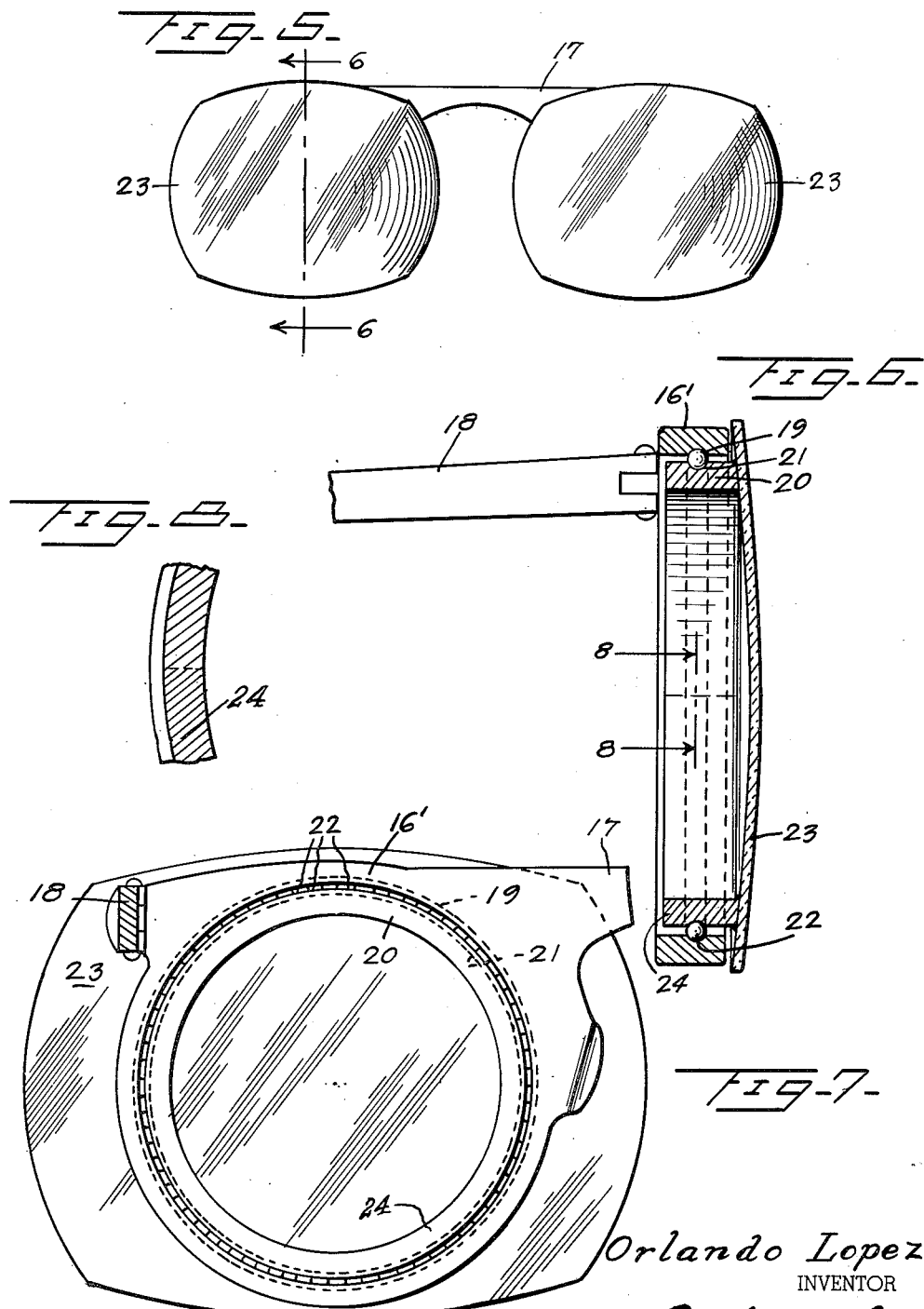

United States Patent Office 3,042,827
Patented July 3, 1962

3,042,827
MOTOR VEHICLE HEADLIGHT CONSTRUCTION AND POLARIZED GLASSES USED THEREWITH
Orlando Lopez, Provenir y Habana Arroyo Apolo, Havana, Cuba
Filed Sept. 30, 1958, Ser. No. 764,335
6 Claims. (Cl. 313—112)

This invention relates to motor vehicle headlight construction, a primary object of the invention being to provide a motor vehicle headlight of the sealed beam type wherein in addition to the conventional headlight lens, a polarized lens is provided spaced from said headlight lens and designed to eliminate glare.

Another object of the invention is to provide a dual headlight lens construction including an inner polarized non-glare lens or filter, which is mounted within the sealed beam headlight for rotary movement within the housing of the headlight to automatically adjust the polarized or movable lens with respect to the conventional stationary lens avoiding glare.

A further object of the invention is to provide a simple mechanism in which centrifugal force created upon the tilting or turning of the vehicle equipped with the device will effect a pivotal movement of the polarized lens within the housing, with the result that the light beam is properly directed, illuminating the road surface in a manner to avoid glare.

Still another object of the invention is to provide a device of this character which will automatically right itself as the vehicle and sealed beam unit return to their normal positions.

A still further object of the invention is to provide polarized eye glasses to be used by the operators of vehicles to further avoid glare from the headlights of approaching motor vehicles.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

FIGURE 1 is a vertical sectional view through a sealed beam headlight, constructed in accordance with the invention.

FIG. 2 is an elevational view of the polarized lens together with the supporting ring or polarized lens mounting.

FIG. 3 is an enlarged fragmental sectional view through the polarized lens mounting.

FIG. 4 is a fragmental sectional view through the supporting ring of the device.

FIG. 5 is a front elevational view of eye glasses wherein the principles of the invention are carried out in the construction of polarized eye glasses.

FIG. 6 is an enlarged sectional view taken substantially along line 6—6 of FIG. 5 as viewed in the direction indicated by the arrows.

FIG. 7 is an enlarged elevational view of an eye glass lens constructed in accordance with the invention.

FIG. 8 is a sectional view taken substantially along line 8—8 of FIG. 6 as viewed in the direction indicated by the arrows.

Referring to the drawings in detail, the sealed beam headlight is indicated generally by the reference character 5 and includes the usual concavo-convex lens 6.

As better shown by FIG. 1 of the drawing, the forward end of the sealed beam is formed with an annular recessed portion 7 in which the bearing ring 8 fits, the bearing ring 8 having recesses 9 for the reception of the ball bearings 10.

The reference character 11 indicates the polarized lens which is held spaced with respect to the lens 6, the periphery of the lens 11 supporting a rubber ring 12, which is formed with a recess of annular formation, into which the periphery of the lens 11 fits.

The rubber ring 12 is formed with an outer annular groove 13 in which the inwardly extended flange 14 of the supporting ring 15 extends, securely holding the supporting ring 14 and polarized lens together.

The supporting ring 14 is also formed with recesses 15' which fall opposite to the recesses 9 of the bearing ring 8, for the reception of the ball bearings 10.

The supporting ring 14 is of a novel construction, in that the normal lower portion 16 of the ring is weighted or constructed of material heavier than the normal upper portion of the ring, so that the ring by gravity, will be maintained in its proper position to insure the true polarization effect of the lens 11 mounted therein.

It might be further stated that the ball bearings 10 provide an exceptionally sensitive but rigid support for the polarized lens 11, and will allow movement of the sealed beam headlight, the weighted supporting ring 14 operating to move the polarized lens 11 to its normal position in the event that the tilting of the sealed beam headlight is sudden. It will of course be understood that otherwise the weighted supporting ring will operate to maintain the polarized lens in its proper operative position to accomplish its purpose.

In sheet 2 of the drawings I have provided the principles of the invention as incorporated in eyeglass construction, the eyeglasses to be used by motorists to further insure against glare from motor vehicle headlights of approaching vehicles.

As shown, the reference character 16' indicates an eyeglass frame including a bridge 17 and temples 18.

The frame 16' as better shown by FIG. 6 of the drawings, is in the form of a substantially wide bearing ring, and is provided with curved recesses 19 formed in the inner surface thereof, the recesses 19 being arranged in spaced relation with each other and in a circular line.

Mounted within the eyeglass frame 16' is a supporting ring 20 that provides a support for the polarized lens 23, and is also formed with curved recesses 21 that fall opposite to the recesses 19 and provide bearings for the balls 22 which provide an exceptionally sensitive connection between the frame 16 and supporting ring 20 to permit the supporting ring 20 and lens to rotate freely.

The supporting ring 20 is of a novel construction and is heavily weighted at its normal lower portion as indicated by the reference character 24, so that the tendency of the supporting ring 20 is to cause the ring and lens to gravitate to their normal viewing position.

Secured to the outer edge of the supporting ring 20, is a polarized lens 23 which is of a diameter to extend over the eyeglass openings, so that the polarized lens 23 will assume the proper viewing position before the eyes of the wearer.

From the foregoing it will be seen that by the use of the eyeglasses equipped with the polarized lenses which are automatically adjustable in accordance with the movements of the head of the person wearing the eyeglasses, the glare from the headlights of oncoming vehicles will be avoided, thereby contributing to safe driving.

What is claimed is:

1. A headlight comprising a sealed beam illuminating unit including an outer lens, a polarized lens disposed in parallel spaced relation with respect to said outer lens, and gravity controlled means for mounting said polarized lens

3 for rotation with respect to said outer lens independently of said outer lens.

2. A headlight comprising a sealed beam illuminating unit including an outer lens, a bearing ring mounted within said sealed beam illuminating unit concentric with the lens thereof, a polarized lens disposed within the sealed beam illuminating unit in parallel spaced relation with respect to the outer lens thereof, a bearing ring mounted within said sealed beam illuminating unit concentric with said outer lens, said bearing ring having recesses, a supporting ring secured to the periphery of said polarized lens, said supporting ring having recesses, the recesses of the bearing ring and supporting ring aligning, ball bearings mounted within said aligning recesses supporting said polarized lens for rotary movement within the sealed beam illuminating unit, and the normal lower section of said supporting ring being heavier than the normal upper portion thereof balancing said polarized lens and adjusting said polarized lens with respect to the outer lense of the unit.

3. A motor vehicle headlight comprising a sealed beam illuminating unit having an outer lens, said unit having an annular groove adjacent to said outer lens within said outer lens, a bearing ring secured within said groove concentric with said outer lens, a polarized lens mounted within said sealed beam illuminating unit, a supporting ring secured to the periphery of said polarized lens, ball bearings mounted between said bearing ring and supporting ring, mounting said polarized lens for rotary movement with respect to said outer lens, and the normal lower portion of said supporting ring being heavier than the normal upper portion thereof holding said polarized lens in its proper illuminating position.

4. A motor vehicle headlight comprising a sealed beam illuminating unit having an outer lens, said unit having an annular groove opening into the interior of said sealed beam unit, a polarized lens mounted within said groove in parallel concentric relation with respect to said outer lens, anti-friction mechanism including a supporting ring, mounted within said groove to which said polarized lens is secured, mounting said polarized lens for rotation with respect to said outer lens, and the normal lower portion of said supporting ring being heavier than the normal upper portion thereof normally holding said polarized lens in its proper light projecting position.

5. A motor vehicle headlight comprising a sealed beam illuminating unit having an outer lens, said unit having an annular groove opening into the interior of said sealed beam unit, a polarized lens mounted within said groove in parallel concentric relation with respect to said outer lens, anti-friction mechanism including a supporting ring, mounted within said groove to which said polarized lens is secured, mounting said polarized lens for rotation with respect to said outer lens, said supporting ring having its lower half made of heavier material than its upper half, thereby maintaining the proper position to insure true polarization effects for said lens.

6. A sealed beam headlight whose major portion has the contour of a paraboloid terminating in a ring at right angles to its axis, said ring being U-shaped in cross-section and of greater diameter than the base of said paraboloid, a lens secured to said ring diametrically opposite the base of said paraboloid, a bearing ring having an annular recess therein, said bearing ring secured in said first ring, a supporting ring having an annular recess in its external surface, said supporting ring being so constructed that the upper half of its body is of lightweight metal and the lower half of said body is of heavier metal, said supporting ring being mounted within the first-mentioned ring, a plurality of ball bearings mounted within said annular recesses in said bearing ring and said supporting ring, and a flat circular polarized lens mounted in said supporting ring to move therewith, thereby projecting filtered light from said headlight regardless of its position.

References Cited in the file of this patent

UNITED STATES PATENTS

| | | |
|---|---|---|
| 1,879,793 | Chubb | Sept. 27, 1932 |
| 2,122,225 | Wheelwright | June 28, 1938 |
| 2,453,194 | Buzzell | Nov. 9, 1948 |
| 2,705,318 | Hallerberg | Mar. 29, 1955 |